US012678845B2

(12) United States Patent
Sra et al.

(10) Patent No.: US 12,678,845 B2
(45) Date of Patent: Jul. 14, 2026

(54) METHODS AND SYSTEM FOR DELIVERING AMENDMENTS TO SUBSURFACE

(71) Applicant: CHEVRON U.S.A. INC., San Ramon, CA (US)

(72) Inventors: Kanwartej Singh Sra, San Ramon, CA (US); Ravindra Vasant Kolhatkar, San Ramon, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/785,668

(22) Filed: Jul. 26, 2024

(65) Prior Publication Data

US 2026/0027606 A1     Jan. 29, 2026

(51) Int. Cl.
 *B09C 1/00* (2006.01)
 *B09C 1/08* (2006.01)
(52) U.S. Cl.
 CPC ................. *B09C 1/002* (2013.01); *B09C 1/08* (2013.01); *B09C 2101/00* (2013.01)
(58) Field of Classification Search
 CPC ........ B09C 1/002; B09C 1/08; B09C 2101/00
 See application file for complete search history.

(56) References Cited

U.S. PATENT DOCUMENTS

| | | | | |
|---|---|---|---|---|
| 5,512,279 | A * | 4/1996 | Jarrett | A01N 63/23 424/93.461 |
| 5,520,482 | A | 5/1996 | Oeste et al. | |

| | | | | |
|---|---|---|---|---|
| 5,611,402 | A * | 3/1997 | Welsh | B09C 1/005 166/373 |
| 6,834,720 | B1 * | 12/2004 | Dwyer | E21B 33/138 166/290 |
| 8,679,340 | B1 | 3/2014 | Ulrich | |
| 2008/0272063 | A1 | 11/2008 | Boulos et al. | |
| 2014/0212956 | A1 * | 7/2014 | Ulrich | C02F 3/344 435/262.5 |
| 2015/0041392 | A1 | 2/2015 | Hu et al. | |
| 2020/0368717 | A1 * | 11/2020 | Donovan | B01J 20/3246 |
| 2021/0354180 | A1 | 11/2021 | Mork | |

(Continued)

FOREIGN PATENT DOCUMENTS

CN          114653741 A       6/2022

OTHER PUBLICATIONS

LUSTLine Bulletin, Issue 93 . Nov. 2023, 23 pages.

(Continued)

*Primary Examiner* — Kyle Armstrong
(74) *Attorney, Agent, or Firm* — HUNTON ANDREWS KURTH LLP

(57) ABSTRACT

The present application relates generally to methods and systems for delivering amendments like sulfate to a subsurface below a ground surface. In one embodiment a process comprises advancing a borehole from the ground surface to the subsurface below the ground surface wherein the borehole is advanced above a water table. The borehole is at least partially filled with a mixture comprising gypsum and a granular media. The borehole is then irrigated with water to at least partially dissolve the gypsum and to spread the dissolved gypsum to a desired treatment zone below the ground surface. The irrigating may comprise employing a gravity fed trickle flow using an irrigation line while the desired treatment zone may comprise one or more hydrocarbons.

20 Claims, 3 Drawing Sheets

(56) References Cited

U.S. PATENT DOCUMENTS

2022/0355354 A1      11/2022  Noland
2023/0226518 A1 *     7/2023  Donovan  .................. B09C 1/08
                                                                502/401

OTHER PUBLICATIONS

Kammy Sra, Ravi Kolhatkar, Daniel Segal, John Wilson. Sulfate Delivery Methods for Enhancing Biodegradation of Petroleum Hydrocarbons, Chevron, 1 page.
Buscheck, T., Mackay, D., Paradis, C., Schmidt, R., de Sieyes, N., 2019. Enhancing microbial sulfate reduction of hydrocarbons in groundwater using permeable filled borings, Groundwater Monitoring & Remediation 39 No. 3: 48-60.
Kolhatkar, R., and M. Schnobrich. 2017. Land Application of Sulfate Salts for Enhanced Natural Attenuation of Benzene in Groundwater: A Case Study. Groundwater Monitoring & Remediation 37 No. 2: 43-57.

* cited by examiner

METHODS AND SYSTEM FOR DELIVERING AMENDMENTS TO SUBSURFACE

FIELD OF THE INVENTION

The present invention relates generally to processes and systems for delivering amendments for remediation to a subsurface.

BACKGROUND AND SUMMARY

Delivery of amendments for remediation of subsurface that is impacted with contaminants is challenging due to, for example, subsurface heterogeneities, distribution of contaminants in the subsurface, and inadequate spatial coverage of amendments. These amendments could be in support of biological processes (e.g., electron acceptors such as sulfate, nutrients such as nitrogen and phosphorus), chemical processes (e.g., chemical oxidants such as persulfate, permanganate) or physical processes (e.g., sorption chemicals such as activated carbon).

Amendments to the subsurface have been typically delivered via dissolved-phase or liquid injections, slurry injections, placement of solids in wells that intersect groundwater flow, or spreading of amendment on land surface followed by irrigation or natural precipitation. Unfortunately, amendment delivery with these methods relies upon injections that are typically conducted under pressure, dissolution and transport of amendments through ambient groundwater or natural precipitation/irrigation. Unfortunately, the distribution of amendments is limited by, for example, wherever the injection fluid preferably goes in the subsurface, by flow characteristics of ambient groundwater, density driven effects, and/or by resistance offered by layers of subsurface soil above the target zone of treatment (in case of land application). In addition, liquid injection delivery also leads to lower persistence of some amendments and might necessitate multiple, costly and/or energy intensive injection events.

For example, land application usually results in slower delivery of the amendment to the desired target depth. Surface land application also requires a clear and unobstructed above surface conditions which may not be available at all sites. Also, at sites in semi-arid or arid climate, surface land application requires artificial irrigation to enable delivery to subsurface.

For example, during liquid injection of amendment, amendment distribution can be either limited in space and time, involves many injection points, misses the target zone, involves multiple injection events, and/or takes a long time for adequate delivery.

What is needed are methods and systems for delivery of amendments with improved spatial distribution, targeting of or intersection with majority of the contamination zone and media (e.g., soil and groundwater), greater persistence, and/or faster, continual supply of desired amendment. Advantageously, the methods and systems described here meet one or more up to all of these needs.

The present application relates generally to methods and systems for delivering amendments like sulfate to a subsurface below a ground surface. In one embodiment, the application pertains to a method for delivering amendments to a subsurface above a water table. The method comprises advancing a borehole from the ground surface to the subsurface below the ground surface. The borehole is at least partially filled with a desired solid amendment during advancing, subsequent to advancing, or any combination thereof. The borehole is irrigated with a solvent to at least partially dissolve the desired amendment and deliver the amendment to a desired treatment zone below the ground surface.

In another embodiment the application pertains to a process which comprises advancing a borehole from the ground surface to below the ground surface wherein the borehole is advanced above a water table. The borehole is at least partially filled with a mixture comprising gypsum and a granular media. The borehole is then irrigated with water to at least partially dissolve the gypsum and to spread the dissolved gypsum to a desired treatment zone below the ground surface. The irrigation may comprise employing a gravity fed trickle flow using an irrigation line while the desired treatment zone may comprise one or more hydrocarbons.

In another embodiment the application pertains to a system for delivering amendments to a subsurface below a ground surface. The system comprises a plurality of boreholes from the ground surface to the subsurface below the ground surface. The plurality of boreholes are advanced below a water table and are at least partially filled with a desired solid amendment. An irrigation line is fluidly connected to the plurality of boreholes. In this manner, the plurality of boreholes are irrigated with a solvent to at least partially dissolve the desired amendment and spread the amendment to a desired treatment zone below the ground surface.

The solvent may include any other desired substance that facilitates, catalyzes, treats, and/or attenuates contaminants. Advantageously, one may employ a solvent that that is enhanced with a liquid activated carbon, a nitrogen source, a phosphorus source, a carbon source, a tracer etc.

BRIEF DESCRIPTION OF THE DRAWINGS

So that the way the above recited features, advantages, and objects of the present invention are attained and can be understood in detail, a more particular description of the invention, briefly summarized above, may be had by reference to the embodiments thereof which are illustrated in the appended drawings. It is to be noted, however, that the appended drawings only illustrate preferred embodiments of this invention and are therefore not to be considered limiting of its scope, for the invention may admit to other equally effective embodiments that vary only in detail. In the drawings.

DETAILED DESCRIPTION

Figure 1:
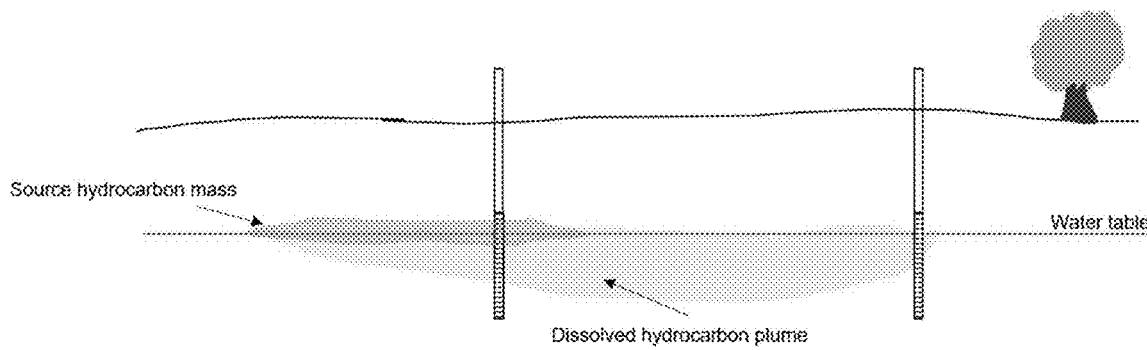
FIG. 1 is an illustration of a generic conceptual site model with petroleum hydrocarbon source zone as an example of contamination in the subsurface.
Figure 2:
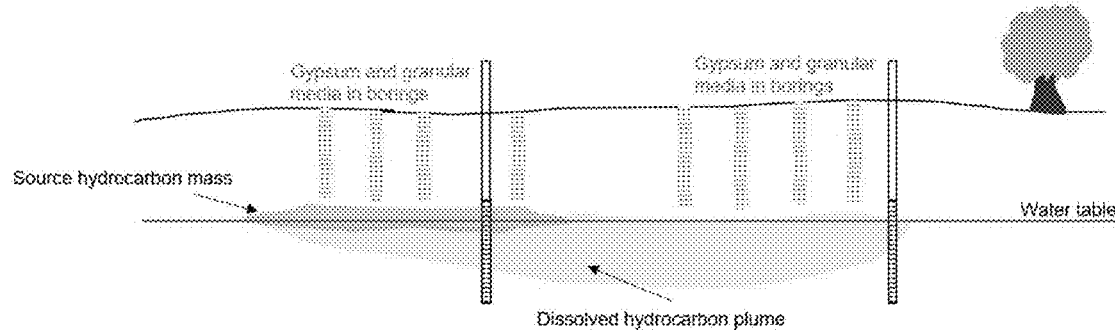
FIG. 2 is an illustration of installation of boreholes filled with an amendment with gypsum and granular media such as sand as an example.
Figure 3:
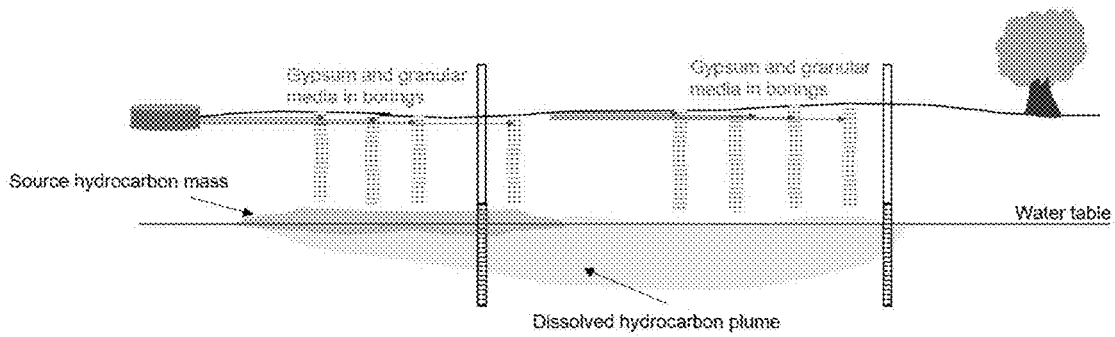
FIG. 3 is an illustration of equipping boreholes with irrigation line to supply water for dissolution and transport of dissolved chemical constituent.
Figure 4:
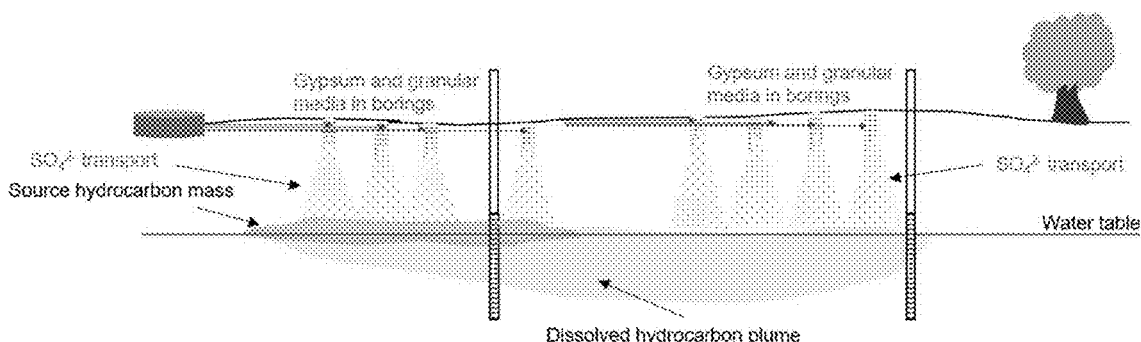
FIG. 4 is an illustration of amendment dissolution and vertical and lateral transport to the desired contamination zone, using sulfate amendment to a hydrocarbon contaminated zone as an example.

Certain terms are used throughout the following description and claims to refer to particular system components. As one skilled in the art will appreciate, different companies may refer to a component by different names.

Definitions

The terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s) but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of +10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

The term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

Unless defined otherwise, all technical and scientific terms used herein have the same meanings as commonly understood by one of skill in the art to which the disclosed invention belongs. All citations referred herein are expressly incorporated by reference.

General Process and System

In one embodiment, the application pertains to a method for delivering amendments to a subsurface below a ground surface. The process comprises advancing at least one borehole from the ground surface to the subsurface below the ground surface. The at least one borehole is at least partially filled with a desired solid amendment during advancing, subsequent to advancing, or any combination thereof. Next, the borehole is irrigated with a solvent to at least partially dissolve the desired amendment and spread the amendment to a desired treatment zone below the ground surface.

The system described here generally pertains to one or more boreholes that extend from the ground surface to the subsurface below the ground surface. The one or more boreholes typically are advanced above or at a water table and are at least partially filled with a desired solid amendment and/or other substances. A suitable irrigation line is fluidly connected to the plurality of boreholes such that the plurality of boreholes are irrigated with a solvent. The irrigation at least partially dissolves the desired amendment and spreads the amendment to a desired treatment zone below the ground surface.

Boreholes

The one or more boreholes of the methods and systems of the present application may be made in any convenient manner so long as the borehole is properly located to deliver an amendment to a desired treatment zone. Therefore, the size, cross-section, location, and manner of making the borehole may vary depending upon the desired amendment or amendments, the desired treatment zone, and the associated irrigation to be employed.

In some embodiments, one or more boreholes are made by advancing a borehole from the ground surface to the subsurface below the ground surface using an auger or any convenient tool for digging a deep, narrow hole, i.e., borehole, in which to house the desired amendments for treatment.

Typically, the one or more boreholes extend above, at, or below the water table but there may be instances in which the treatment zone does not require that such that one or more boreholes filled with an amendment do not extend below the water table. The one or more boreholes may extend substantially vertically downward or one or more of the boreholes may be angled) or even angled and then substantially horizontal) with respect to the ground surface. Such angled boreholes may be desirable when the ground surface comprises objects or obstacles or the ground immediately beneath the surface prevents or restricts substantially vertical boreholes. Such angled boreholes may also be desirable to facilitate delivery or spreading of the amendments more directly to the desired treatment zone.

The one or more boreholes may be advanced into, through, made adjacent to a desired treatment zone, and/or any combination thereof depending upon the number of boreholes. In some embodiments the desired treatment zone is a contamination zone comprising one or more hydrocarbons. Such hydrocarbons are not particularly limited and may comprise, for example, petroleum hydrocarbons. In one specific embodiment, one or more boreholes may be advanced in subsurface to a region above a contamination zone comprising one or more hydrocarbons, e.g., a petroleum hydrocarbon smear zone. As described below, the one or more boreholes then facilitate delivery of amendments to the contamination zone.

In some embodiments it may be desirable to line one or more boreholes with a lining. The lining may facilitate maintaining the borehole such that further amendments may be added in the future without re-digging or re-drilling the borehole. The material of the lining may vary depending upon the desired effect, the nature of the ground and sub-surface, and the amendments to be delivered. For example, the lining may comprise a conduit or tubing that allows for passage of the amendment through the conduit or tubing. In some embodiments, the lining may be perforated such that dissolved amendments may at least partially flow through or substantially all dissolved amendment flow through the perforations.

The number of boreholes employed in the methods and systems are not particularly limited and may vary depending upon the area of the treatment zone, the type of amendment(s) to be delivered or spread, and/or the desired effect. Other factors include, e.g., size or footprint requiring treatment, geology, depth of impact, remediation goals and timeline.

Typically, at least one, or at least two, or at least three, or at least four, or at least six, or at least ten boreholes are employed. One the other hand, the number of boreholes is usually less than 50, or less than 35, or less than 15 boreholes per treatment zone.

Amendments and Optional Granular Media

The amendments that can be employed in the methods and systems are not limited so long as the amendment can be delivered as desired through the one or more boreholes. While the amendments may be liquid in many cases the one or more amendments are solid. In this manner, a solvent may be employed to at least partially dissolve the amendment in the one or more boreholes and spread the amendment to a desired treatment zone which may or may not be below the water table.

The amendments are typically employed in a manner in which the one or more boreholes are at least partially filled with the desired amendment or amendments. Such filling may be accomplished during advancing of the one or more boreholes, subsequently to advancing, or any combination thereof. If a lining is employed, then usually the borehole is filled by putting the desired amendment and/or any other components into the lining after installation of the lining.

Suitable amendments depend on the desired treatment. For treatment of one or more hydrocarbons in a contaminated zone, in one embodiment the amendment comprises sulfates in the form of a soluble solid, e.g., a water soluble solid such as gypsum.

If desired a granular or other media may be employed with the desired amendment(s). The granular media, if employed, may be mixed with a the one or more amendments. Alternatively, or additionally, the granular media may be employed so as to selectively place a desired amendment at a specific height or location within the one or more boreholes. That is, layers of granular media and amendment may be strategically placed such that amendments are delivered to desired locations adjacent an amendment layer within the one or more boreholes.

The granular media may be any suitable substance that does not dissolve upon introduction of a solvent such as water into the one or more boreholes. Such granular media may comprise, for example, sand, gravel, activated carbon, or any combination thereof.

Solvent

In the embodiments where at least one solid amendment is in one or more boreholes, then the systems and methods may provide for irrigating the borehole with a solvent. The specific manner of irrigating and specific solvent are not critical so long as the desired amendment(s) are at least partially dissolved and spread to the desired treatment zone below the ground surface.

The specific irrigating and solvent will necessarily vary depending upon the amendment, borehole locations, and desired treatment. In some embodiments the irrigating comprises employing a gravity fed trickle flow using an irrigation line as shown in, for example, FIGS. 1-4. Such as gravity fed trickle flow is advantageously less energy intensive than a pressure or active irrigation step employing sprinklers. In gravity fed trickle flow, water and/or other solvent is simply fed in a manner in which it is allowed to flow via gravity and dissolve the amendment, e.g., solid sulfate such as gypsum. The dissolved gypsum and/or other amendments are spread laterally, vertically, or both from the borehole. In some embodiments the gravity fed trickle flow is configured to spread dissolved gypsum and/or other amendments laterally, vertically, or both due to advective, dispersive, and diffusive processes. If desired, the water or other solvents may comprise other amendments, a catalyst for dissolution, or other components that do not significantly interfere with the desired dissolution or spread of the amendments into the treatment zone.

The solvent may include any other desired substance that facilitates, catalyzes, treats, and/or attenuates contaminants. Advantageously, one may employ a solvent that that is enhanced with a liquid activated carbon, a nitrogen source, a phosphorus source, a carbon source, a tracer etc.

Examples

Solid filled borings or conduits were tested to assess the dissolution of an amendment (dissolved sulfate from gypsum in this case) and delivery into the subsurface. Seven 10-12-inch diameter boreholes were installed to a depth of 5.5 ft below ground surface (ft bgs) in a Test plot equipped with 4 multilevel sampling points. Agricultural gypsum was mixed with sand in a 1:1 mass ratio and emplaced into each of the 7 boreholes. A separate Control plot also equipped with 4 multilevels was used to compare natural variability in sulfate concentrations in both soil and groundwater. A conceptual illustration of the solid filled conduit is provided on FIG. 5A. As shown on this figure, conduits were installed to approximately 5.5 ft bgs, implying they ended in the shallow smear zone (which extends into the silty clay vadose zone) and above the groundwater table. With a target spacing of 5-10 ft between conduits, the 7 conduits were installed approximately within 5 ft of the central multilevel groundwater sampling points. The intent with the solid filled conduits in this case was to not create a direct conduit to the groundwater, but to allow infiltration of sulfate-laden water and enable delivery to the target vadose zone and subsequently to target groundwater.

The infiltration of sulfate-laden water from these boreholes was supported by an irrigation line with a trickle flow into these gypsum-filled boreholes such that these act as sources and conduits for sulfate delivery to the subsurface.

Prior to advancement of boreholes and amendment emplacement, baseline sampling for soil and groundwater was conducted. Soil sampling was conducted adjacent to the multilevel groundwater sampling points for both Control and Test plots. Soil samples were collected from approximately three depth intervals in the vadose zone and shallow groundwater. Groundwater sampling was conducted from the 4 multilevel monitoring points. The shallowest multilevel was always dry and no groundwater sampling was collected from this depth. Following the baseline sampling, two soil sampling and three groundwater sampling events were conducted.

Figure 5B:
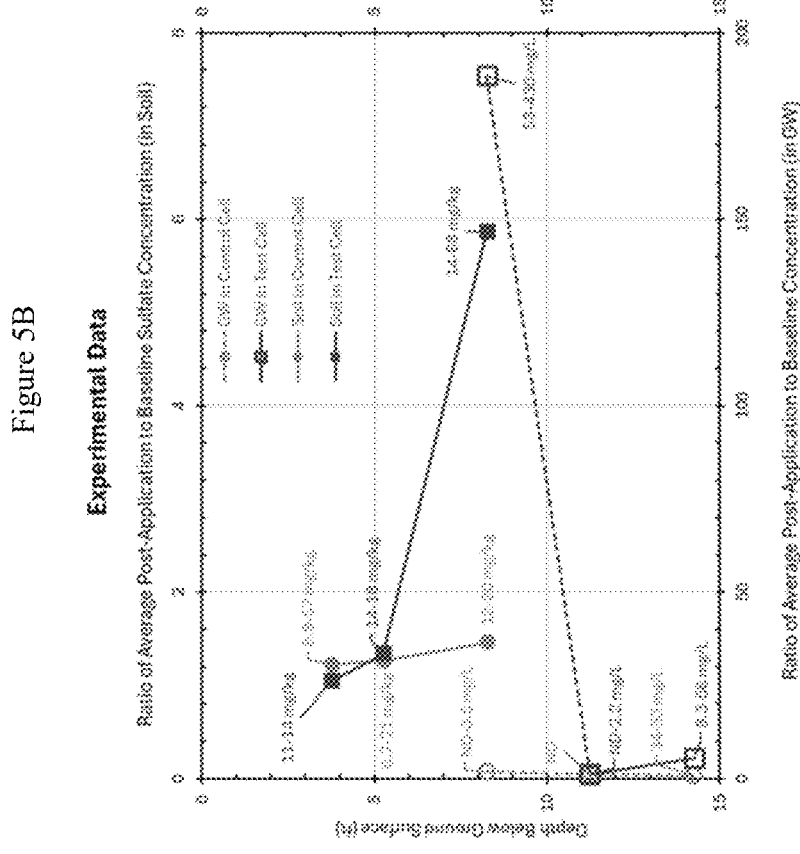
FIG. 5B shows experimental data.
Figure 5A:
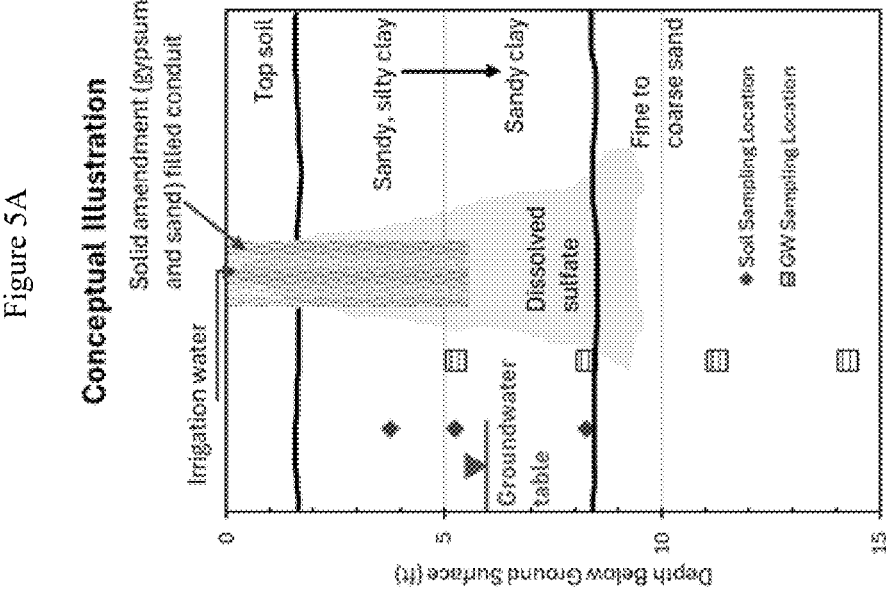
FIG. 5A shows a solid amendment filled conduit.

Change in sulfate concentration in soil or groundwater was considered with respect to the baseline conditions for the Control and the Test plot and also compared to between the two plots. The ratios of post-application sulfate to baseline sulfate concentration are presented on FIG. 5B. Also, the soil and groundwater concentrations for the post-application time duration for the two plots are provided as data labels on FIG. 5B. FIG. 5B illustrates that the soil and groundwater concentrations of sulfate following solid conduit installation in the Test plot were around 2.7 times higher in soil (at depth of around 8 ft bgs) and around 100 times higher in groundwater (maximum difference at around 8 ft bgs). The ratios with respect to their baseline concentrations also show that significantly higher ratios (up to 10 for soil and up to 430 for groundwater) were achieved in the Test plot than in the Control plot (ratio of up to 2 for both soil and groundwater). This demonstrates that the amendment (sulfate in this case) was effectively delivered into the subsurface.

It will be understood that various modifications may be made to the embodiments disclosed herein. Therefore, the above description should not be construed as limiting, but merely as exemplifications of example embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. A method for delivering sulfate to a subsurface below a ground surface comprising:
   advancing a borehole from the ground surface to the subsurface below the ground surface wherein the borehole is advanced above a water table;
   at least partially filling the borehole with a mixture comprising gypsum and a granular media; and
   irrigating the borehole with water to at least partially dissolve the gypsum and to deliver the dissolved gypsum to a desired treatment zone below the ground surface wherein the irrigating comprises employing a gravity fed trickle flow using an irrigation line and wherein the desired treatment zone comprises one or more hydrocarbons.

2. The method of claim 1 which further comprises lining the borehole with a perforated lining prior to the at least partial filling and wherein the at least partially filling the borehole comprises putting the mixture into the perforated lining.

3. The method of claim 1 wherein the granular media is sand, gravel, activated carbon, or any combination thereof.

4. The method of claim 1 wherein the mixture further comprises one or more amendments.

5. The method of claim 1 wherein the water further comprises one or more dissolved amendments.

6. The method of claim 1 wherein the dissolved gypsum is spread laterally, vertically, or both from the borehole.

7. The method of claim 1 wherein the gravity fed trickle flow is configured to spread dissolved gypsum laterally, vertically, or both due to advective, dispersive, and diffusive processes.

8. A method for delivering amendments to a subsurface below a ground surface comprising:
   advancing a borehole from the ground surface to the subsurface below the ground surface;
   at least partially filling the borehole with a desired solid amendment during advancing, subsequent to advancing, or any combination thereof;
   irrigating the borehole with a solvent to at least partially dissolve the desired amendment and deliver the amendment to a desired treatment zone below the ground surface.

9. The method of claim 8 wherein the irrigating comprises employing a gravity fed trickle flow using an irrigation line.

10. The method of claim 8 which further comprises at least partially filing the borehole with a granular media.

11. The method of claim 8 wherein the granular media is sand, gravel, or any combination thereof.

12. The method of claim 8 wherein the desired solid amendment is water soluble and the solvent is water.

13. The method of claim 8 wherein the desired solid amendment comprises a sulfate.

14. The method of claim 8 wherein the desired solid amendment comprises gypsum.

15. The method of claim 8 wherein the borehole is advanced into a contamination zone in need of remediation with the desired amendment.

16. The method of claim 8 wherein the borehole is advanced through a contamination zone in need of remediation with the desired amendment.

17. The method of claim 8 wherein the borehole is advanced adjacent a contamination zone in need of remediation with the desired amendment.

18. The method of claim 8 wherein the borehole is advanced to above a water table.

19. The method of claim 8 wherein the treatment zone comprises one or more hydrocarbons.

20. A system for delivering amendments to a subsurface below a ground surface comprising:

a plurality of boreholes from the ground surface to the subsurface below the ground surface wherein the plurality of boreholes are advanced above a water table and wherein the plurality of boreholes are at least partially filled with a desired solid amendment; and an irrigation line fluidly connected to the plurality of boreholes such that the plurality of boreholes are irrigated with a solvent to at least partially dissolve the desired amendment and deliver the amendment to a desired treatment zone below the ground surface.

* * * * *